3,649,646
Patented Mar. 14, 1972

3,649,646
1-(3',7' - DIMETHYLOCT - 6' - ENYLOXY)-3,4-METHYLENEDIOXYBENZENES AND THE 6',7'-EPOXY DERIVATIVES THEREOF
John B. Siddall, Palo Alto, Calif., assignor to Zoecon Corporation, Palo Alto, Calif.
No Drawing. Filed July 30, 1970, Ser. No. 59,737
Int. Cl. C07d 13/10
U.S. Cl. 260—340.5     5 Claims

ABSTRACT OF THE DISCLOSURE

Citronellyl ethers and derivatives for insect control.

---

This invention relates to novel citronellyl ethers and derivatives, synthesis thereof and methods and compositions for the control of insects.

One embodiment of the present invention is the novel citronellyl ethers of the Formulas I and II:

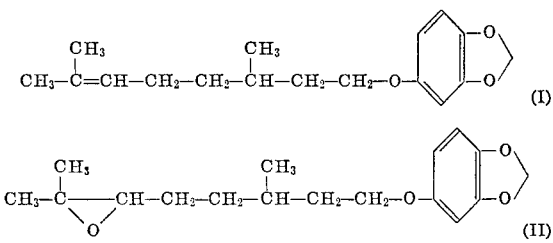

Another embodiment of the present invention is the control of insects which comprises treating the insects with a compound of Formula I or II. The compounds of Formulas I and II are very effective for the control of bugs of the family Miridae, such as Lygus bugs (Lygus sp.), e.g. Lygus hesperus, Lygus vasseleri, Lygus virens, Lygus apicalis, Lygus elisia, Lygus pratensis and Lygus sallei. The compounds of the present invention can be applied by diluting the compound in a carrier, liquid or solid, such as water, mineral and vegetable oils, silica, talc, and the like. Other ingredients can be included such as emulsifying agents and wetting agents. Generally, the formulation will contain less than 95% by weight of the active compound and more frequently less than 25%. The active compound is applied at very low dosage level of the order of 0.005 µg. to 1.000 µg. per bug.

W. S. Bowers, "Juvenile Hormone: Activity of Aromatic Terpenoid Ethers," Science 164, 323–325 (April 18, 1969) describes several aromatic terpenoid ethers which are similar to the compounds of Formulas I and II. The compounds of Bowers are di-olefins and mono-unsaturated olefinic epoxides. The compounds of the present invention are more stable, have greater activity on bugs of the family Miridae and are made from inexpensive and readily available starting materials.

The compounds of Formulas I and II exist as the D-isomer, L-isomer and the racemic mixture (DL). Although the individual isomers can be used for the control of insects, for practical reasons there is generally employed the racemic mixture.

The following examples are provided to illustrate the practice of the present invention and the preparation of the compounds of the present invention.

EXAMPLE 1

To 250 ml. of anhydrous pyridine, cooled to ice temperature, is added 35.2 g. of p-toluenesulfonyl chloride. When the sulfonyl chloride is dissolved, 25 g. of L-citronellol is added and washed in with 10 ml. of anhydrous pyridine. The reaction mixture is about 90% complete after five hours and then left overnight below room temperature. The 40 ml. of cold water is added and the mixture stirred for one hour at ice temperature. The mixture is extracted with pentane. The pentane extracts are combined, washed with 10% HCl, water and dried over potassium sulfate/potassium carbonate and evaporated to yield the tosylate.

To a solution of 36.4 g. of dry sodium iodide and 160 ml. of dry acetone is added 38.6 g. of the above tosylate in 40 ml. of dry acetone and the reaction mixture stirred 16 hours at room temperature. The mixture is filtered and the filtrate concentrated. The concentrate is taken up in pentane, washed with water, dried over sodium sulfate and evaporated to yield the L-citronellyl iodide.

To a mixture of 3 g. of L-citronellyl iodide, 1.5 g. of potassium carbonate and 30 ml. of dimethylacetamide is added 1.69 g. of sesamol and then the mixture refluxed for two hours. under nitrogen. The reaction is worked up by pouring into water and extracting with pentane. The combined pentane extract is washed with 10% NaOH and water until neutral and dried over sodium sulfate. The product is purified by chromatography using hexane/ethyl acetate (9:1) to yield the L-citronellyl ether of sesamol, 1 - (3',7'-dimethyloct-6'-enyloxy)-2,4-methylenedioxybenzene, which can be further purified by distillation.

EXAMPLE 2

To a solution of 0.25 g. of the D-citronellyl ether of sesamol and 10 ml. of methylene chloride, cooled to ice temperature, is added 0.19 g. of m-chloroperbenzoic acid (85%) in portions. The reaction is stirred at ice temperature for about five hours. The mixture is then washed with 10% sodium sulfite, saturated sodium bicarbonate and water, dried over sodium sulfate and evaporated to yield 1 - (6',7'-oxido-3',7'-dimethyloctanyloxy)-3,4-methylenedioxybenzene (D-isomer) which is separated by chromatography using hexane/ethyl acetate and further purified, if desired, by distillation.

The foregoing process is repeated using the L-isomer of 1 - (3',7' - dimethyloct - 6'-enyloxy)-3,4-methylenedioxybenzene to yield the corresponding 6,7-epoxide.

The D-citronellyl ether of sesamol is made from D-citronellyl bromide following the procedure of Example 1 (3rd paragraph).

By using a racemic mixture of 1-(3'-7'-dimethyloct-6'-enyloxy)-3,4-methylenedioxybenzene in the process of this example, a racemic mixture of 1-(6'-7'-oxido-3',7'-dimethyloctanyloxy)-3,4-methylenedioxybenzene is obtained.

The effectiveness of the compounds of the present invention is demonstrated below. The test substances A and B were applied topically at dosage levels at 0.005, 0.05 and 0.5 microgram in 0.5 microliter of acetone to Lygus hesperus larvae (5th instar). Ten larvae were used for each dosage level. A second experiment was done applying test substance A at dosage levels of 0.005, 0.5 and 5.0 micrograms and test substance B at 0.005, 0.05 and 0.5 microgram. The juvenile homone activity is stated in $ID_{50}$ which is the amount of compound in micrograms resulting in abnormal morphological change in fifty percent of the specimens treated. The $ID_{50}$ is computed by plotting on semilograrithmic paper the dose on the horizontal axis and the result on the vertical axis.

| Test substance | $ID_{50}$ | |
|---|---|---|
|  | Test 1 | Test 2 |
| A | 0.140 | 0.120 |
| B | 0.085 | 0.050 |

NOTE.—A is 1-(6',7'-oxido-3',7'-dimethyloct-2'(trans)-enyloxy-3,4-methylenedioxybenzene; B is 1-(6',7'-oxido-3',7-dimethyloctanyloxy)-3,4-methylenedioxybenzene (D-isomer).

What is claimed is:
1. A compound selected from those of the following Formulas I and II:

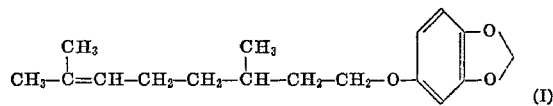

(I)

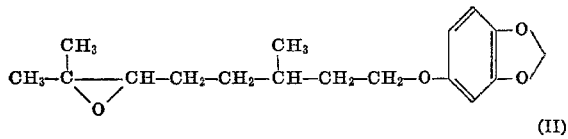

(II)

2. A compound of Formula I according to claim 1, as a racemic mixture.

3. The D-isomer of a compound of Formula I according to claim 1.

4. A compound of Formula II according to claim 1, as a racemic mixture.

5. The D-isomer of a compound of Formula II according to claim 1.

References Cited

Bowers, "Science," vol. 164 (3877), 1969, pp. 323–5.

ALEX MAZEL, Primary Examiner

J. H. TURNIPSEED, Assistant Examiner

U.S. Cl. X.R.

424—278